(12) United States Patent
Schwartz et al.

(10) Patent No.: US 7,991,676 B1
(45) Date of Patent: Aug. 2, 2011

(54) SINGLE PREMIUM IMMEDIATE ANNUITY WITH ADJUSTABLE PAYMENT

(75) Inventors: Lisa Ellis Schwartz, Helotes, TX (US); Phillip Neil Beyer, Fair Oaks Ranch, TX (US); Douglas Irby Ward, San Antonio, TX (US); Christopher Charles Ogburn, Helotes, TX (US); John Dale Hegstrom, San Antonio, TX (US); Ronald Bryan Sweet, San Antonio, TX (US); Sarah Brooke Severson, San Antonio, TX (US); Robert J. Schaffer, III, Middleton, WI (US); Christopher P. Keene, Spring, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/838,257

(22) Filed: Jul. 16, 2010

Related U.S. Application Data (63) Continuation of application No. 11/735,203, filed on Apr. 13, 2007, now Pat. No. 7,783,550.

(60) Provisional application No. 60/919,775, filed on Mar. 22, 2007.

(51) Int. Cl.
*G06Q 40/00* (2006.01)

(52) U.S. Cl. .................................... 705/36 R; 705/37
(58) Field of Classification Search ............ 705/36 R–37
See application file for complete search history.

(56) References Cited

U.S. PATENT DOCUMENTS

2008/0167987 A1* 7/2008 Pflieger ........................ 705/39

\* cited by examiner

*Primary Examiner* — Thu Thao Havan
(74) *Attorney, Agent, or Firm* — Kilpatrick Townsend & Stockton LLP

(57) ABSTRACT

A fluctuating annuity payment is determined and generated, and that annuity payment is subsequently fixable. The fluctuating annuity payment may be based on an interest rate, such as the market yield of a 1-year U.S. Treasury adjusted to constant maturity, for example. The fluctuating annuity payment may be determined on a certain date, or periodically, for example. The annuity payment, while fluctuating, may have a predetermined floor or minimum threshold amount that is does not pay less than. At some point, a request may be received to fix the payment, and the fluctuating annuity payment is converted to a fixed annuity payment. The fixed annuity payment may be based on a long term interest rate, for example. After receiving a request to fix the annuity payment, a payment schedule may be determined based on the value of the remaining payments that are to be made.

21 Claims, 9 Drawing Sheets

SINGLE PREMIUM IMMEDIATE ANNUITY WITH ADJUSTABLE PAYMENT

CROSS-REFERENCE TO RELATED SUBJECT MATTER

This application is a continuation of and claims priority under 35 U.S.C. §120 to pending U.S. application Ser. No. 11/735,203, filed on Apr. 13, 2007, entitled, "Single Premium Immediate Annuity With Adjustable Payment," which in turn claims priority to U.S. Provisional Application No. 60/919,775, filed Mar. 22, 2007, entitled "Single Premium Immediate Annuity With Adjustable Payment". This application is also related to subject matter disclosed in the following commonly assigned applications: U.S. patent application Ser. No. 11/735,224, filed Apr. 13, 2007, entitled "Single Premium Immediate Annuity With Adjustable Payment"; and U.S. patent application Ser. No. 11/735,214, filed Apr. 13, 2007, entitled "Single Premium Immediate Annuity With Adjustable Payment." The contents of each of the above-referenced U.S. patent applications are herein incorporated by reference in their entirety.

BACKGROUND

The application relates generally to financial products known as annuities. An annuity is an insurance policy including a guarantee that the issuer will make a series of payments. This policy is usually given in exchange for a sum of money that the issuer may invest in short or long term investments. There are two types of annuities, immediate annuities and deferred annuities. An immediate annuity is an annuity where the annuitant receives payments immediately and a deferred annuity is one where the annuitant receives a lump sum at the end of a time period. The advantage of the deferred annuity is that generally the account is not taxed until the lump sum is paid. Generally immediate annuities are structured so that the payment varies with the performance of a specific set of investments, or an index. Typically, in prior art immediate annuities the interest rate used to calculate the varying payments is set at the time the annuity is purchased. Since the interest rate is fixed at the time of purchase, individuals who are thinking of purchasing an annuity will generally try to avoid buying one when interest rates are low because they will then be stuck with a low interest rate for the life of the annuity.

SUMMARY

A single premium immediate annuity allows the annuitant to receive an adjustable payment based on a fluctuating interest rate until the annuitant exercises an option to fix the rate (e.g., when the interest rate is high, when the annuitant desires a set known payment, etc.). The annuity described more fully herein gives annuitants more options and more reasons to enter into annuity contracts even with the market may be considered to be currently unfavorable.

A fluctuating annuity payment is determined and generated, and that annuity payment is subsequently fixable. The fluctuating annuity payment may be based on an interest rate, such as the market yield of a 1-year U.S. Treasury adjusted to constant maturity, for example. The fluctuating annuity payment may be determined on a certain date, or periodically, for example. The annuity payment, while fluctuating, may have a predetermined floor or minimum threshold amount that is does not pay less than. At some point, a request may be received to fix the payment, and the fluctuating annuity payment is converted to a fixed annuity payment. The fixed annuity payment may be based on a long term interest rate, for example. After receiving a request to fix the annuity payment, a payment schedule may be determined based on the value of the remaining payments that are to be made.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Figure 1:
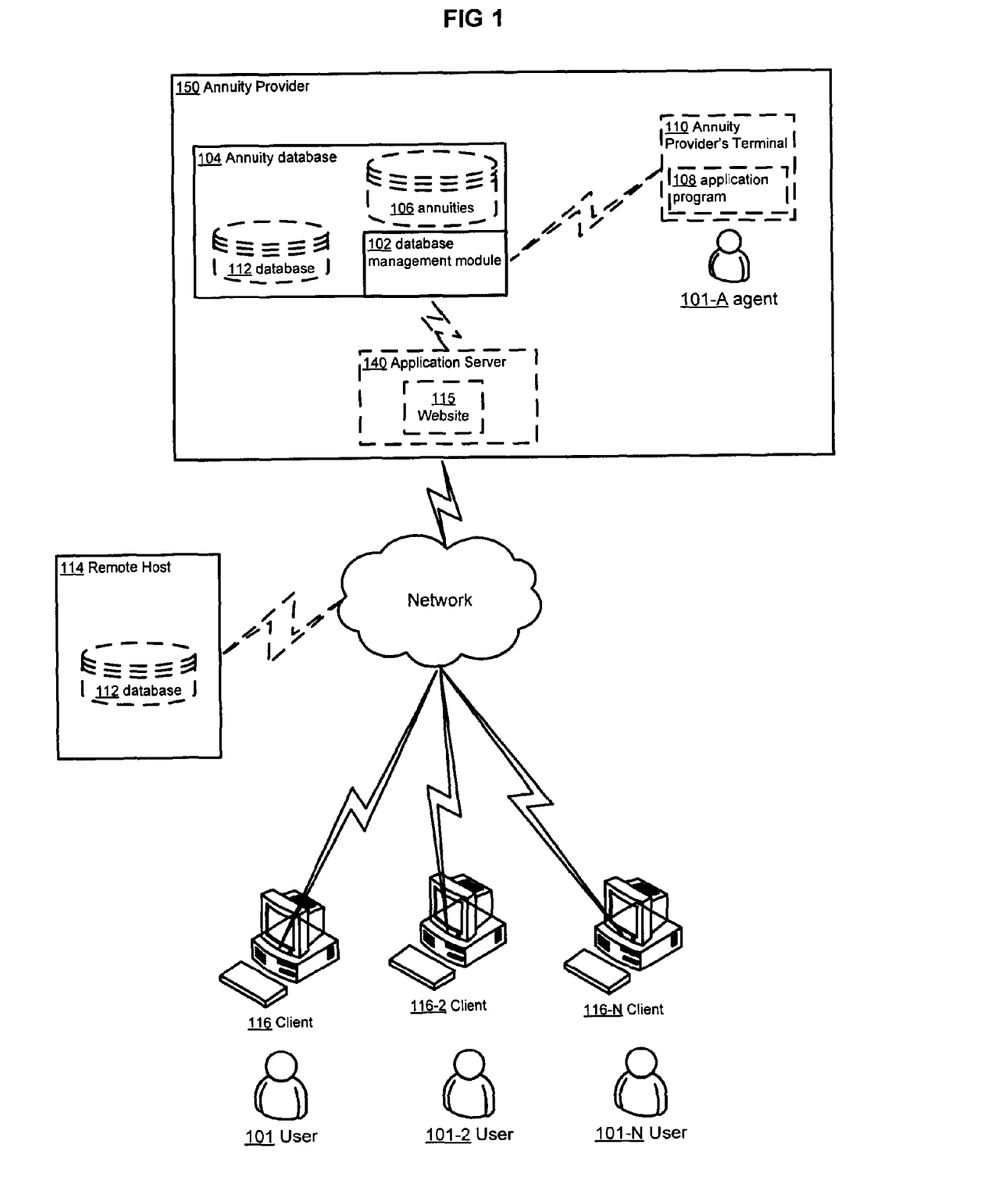
FIG. 1 is a diagram of an example system in which example techniques for providing adjustable annuities may be implemented.

FIG. 1 is a block diagram of an example system in which aspects of the invention may be embodied. The following paragraphs describe the elements in FIG. 1 briefly, and the elements depicted in FIG. 1 will be described in more detail within the context of the operational procedures described below. Those skilled in the art will note that some elements depicted in the block diagram are indicated in dashed lines which in general and throughout the disclosure, is indicative of the fact that they are considered optional.

One or more users 101 through 101-N (where N is an integer greater than 1) utilizing associated computing devices 116, referred to herein as clients, are desirably in communication with an annuity provider 150 via a network, such as the internet. The annuity provider 150 may include in some embodiments an application server 140, e.g., a server computer operating in a computer network dedicated to running one or more software application programs including a website 115. The application server 140 that is optionally located at the annuity provider's location 150 may be electronically connected to a database management module 102, e.g., one or more software programs that operates and maintains databases 112. The database management module 102 can be part of the annuity provider's database 104 that includes a list of users 101-101-N and their associated annuities 106 and database of information 112.

The annuity provider 150 may optionally have at its location one or more annuity agents 101-A and their associated terminals 110. The terminals may include an application program 108 that allows the agent 101-A to access the database 112 and manipulate the data stored in the database 112. Also shown in FIG. 1 is remote host 114 which includes a database 112. The database 112 may include interest rates currently available or, in some embodiments the database may include an index which is a statistical measure of change in an economy or a securities market.

One skilled in the art will recognize that the operational steps illustrated in FIGS. 2-9 are examples and other embodiments exist. Those skilled in the art will note that some operations in FIGS. 2-9 are indicated by dashed lines, which, in general, indicates that they are to be considered optional. More specifically, different implementations will typically employ one or more herein-described operations dependent upon context, and the selection of the appropriate operation(s) appropriate to the various context(s) is within the skill of one in the art in light of the teachings herein.

Figure 2:
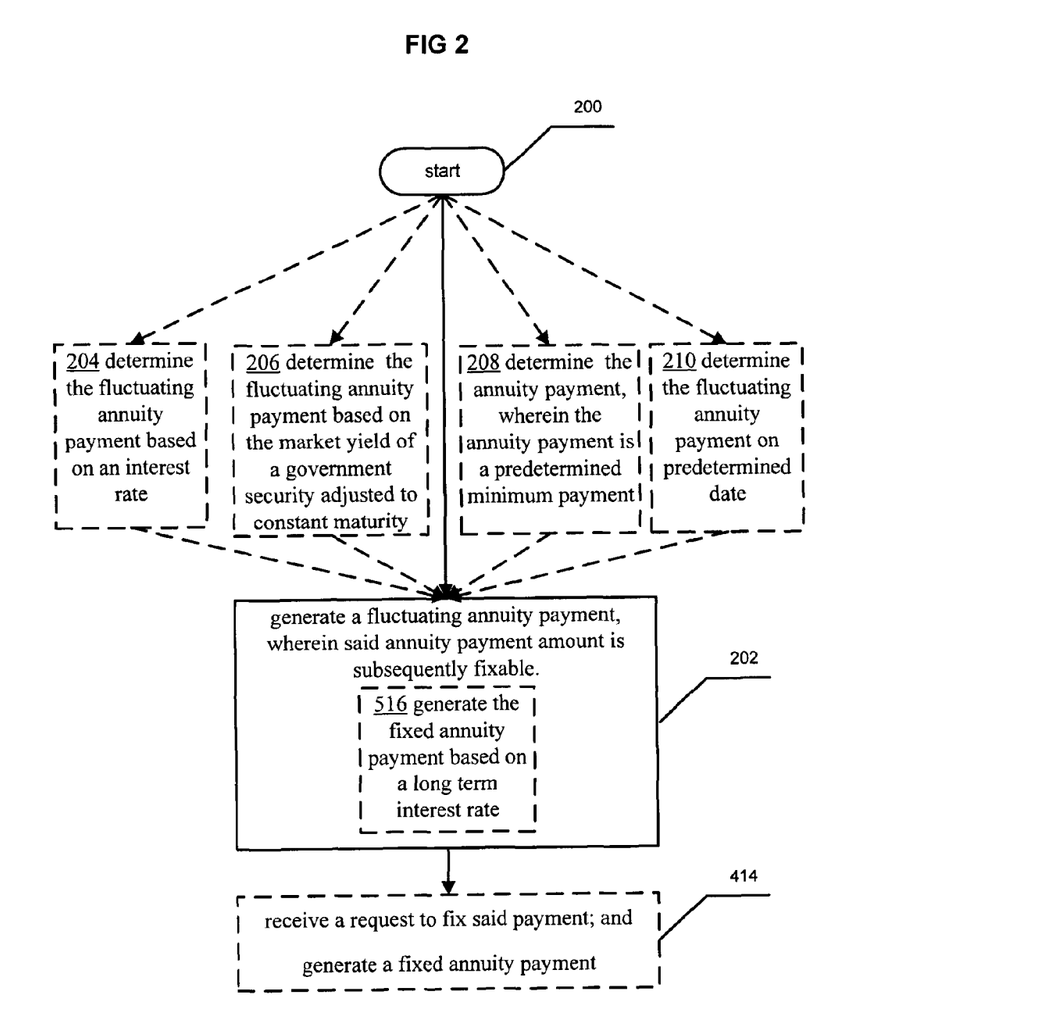
FIG. 2 illustrates an operational flow representing example operations related to providing adjustable annuities including additional optional operations.

FIG. 2 illustrates example operations related to providing an income stream including operations 200-202. Operation 200 begins an example operational process, typically at an annuity provider pursuant to making an annuity payment to the beneficiary of the annuity. Operation 202 illustrates generating a fluctuating annuity payment, wherein said annuity payment amount is subsequently fixable. For example, a database management module 102 of annuity database 104 generates a fluctuating annuity payment for a specific annuity 106 belonging to a specific user 101. The database management module 102 may include database management software, e.g., software designed for the purpose of managing a database 104 such as one or more software programs included in a software package that controls the organization, storage, and retrieval of data in one or more databases. The database management software may additionally include one or more programs operable to perform various operations on the data stored in the database 104 including software to calculate a fluctuating annuity payment by receiving variables such as the annuitant's age and gender, the mortality factors, the value of the adjustment base on a measurement date. Desirably, computer software designed to manage a database of annuities calculates a payment to be transmitted to a user 101.

In other example embodiments the operational flow 200 may include, for example, operation 204 that depicts determining the fluctuating annuity payment based on an interest rate. For example, database management module 102 determines a fluctuating annuity payment wherein the annuity payment is based on a changing interest rate. The database management module 102 may retrieve an interest rate from a database 112 (the database 112 may optionally be a hosted by a remote host 114 and may be connected to the annuity database 104 via a network connection such as the internet, or the annuity provider 150 may optionally include an database 112). The database 112 may include one or more interest rates of one or more securities at the time of calculation. As one skilled in the art will note, the interest rate utilized in operation 206 may be, for example, based on a combination of factors including but not limited to a combination of investments the provider 150 can purchase at the time, the provider's competitive strategy, the provider's expenses and capital structure. The database management module 102 may utilize a current interest rate retrieved from the database 112 in determining a fluctuating annuity payment for a specific annuity stored in a database of annuities 106.

Additionally or alternatively, the operational flow 200 may include operation 206 depicting determining the fluctuating annuity payment based on the market yield of a government security adjusted to constant maturity. For example, database management module 102 determines a fluctuating annuity payment wherein the annuity payment is based, for example on the initial interest rate and the change in the market yield of a 1-year U.S. Treasury adjusted to constant maturity. The database management module 102 may retrieve information from the Federal Reserve Bulletin Release H.15, for example, from the website www.federalreserve.gov and utilize the information in determining a fluctuating annuity payment. For example, computer software designed to manage a database of annuities retrieves market yield information from the internet and uses the information to calculate a fluctuating annuity payment.

Additionally or alternatively, the operational flow 200 may include operation 208 which illustrates a generating fluctuating annuity payment that does not go below a predetermined minimum payment. In embodiments that include this operation a database management module 102 may check to see if the determined annuity payment is greater than an agreed upon minimum payment. For example, computer software may include a procedure for comparing the calculated fluctuating annuity payment to a minimum payment defined in a contract and determine what payment is greater. The greater payment is then provided to the user 101 or a user's beneficiary. In this manner, the user 101 or beneficiary is guaranteed to at least receive a minimum payment regardless of the factors that may be used in determining the fluctuating annuity payment.

Additionally or alternatively, the operational flow 200 may include operation 210 which determines the fluctuating annuity payment on predetermined date. For example, database management module 102 may retrieve information from an insurance contract to determine a date, e.g., once a month or once a year, that the associated computer software is to calculate a fluctuating annuity payment.

As depicted by example operation 414 of FIG. 2, a request may be received, e.g., from the annuity purchaser or beneficiary, to fix the payment. In this manner, the fluctuating payment is fixed and no longer fluctuates. The fixed payment amount is determined by the provider 150. For example, database management module 102 of annuity database 104 receives a request to fix a fluctuating annuity payment from a user 101 or an annuity provider's terminal 110 and generates a fixed annuity payment.

The database management module 102 may receive requests from one or more clients 116. The clients may transmit a request to fix a payment over a network connection to a website 115 maintained by an application server 140. The website 115 may be operable to receive requests to fix annuity payments by transmitting code such as html code to client 116 that is operable to generate one or more web pages including an option to fix an annuity payment.

The database management module 102 may receive requests from an annuity provider's terminal 110. The annuity provider's terminal 110 may include an application program 108 that is operable to query the database management module 102 and submit requests to fix annuity payments. One skilled in the art will note that the invention is not limited to these disclosed embodiments and additional embodiments exist.

As depicted by operation 516 of FIG. 2, once the database management module 102 of annuity database 104 has received a request to fix an annuity payment, the database management module 102 may create a payment for the user 101 based on one or more factors such as the interest rates at the time the annuity payment is being fixed. In embodiments that include optional operation 516 the fixed annuity payment amount may be based on a long term interest rate, such as the long term interest rate of a long term fixed income security or the interest rate on a note or bond that matures in at least 10 years.

Figure 3:
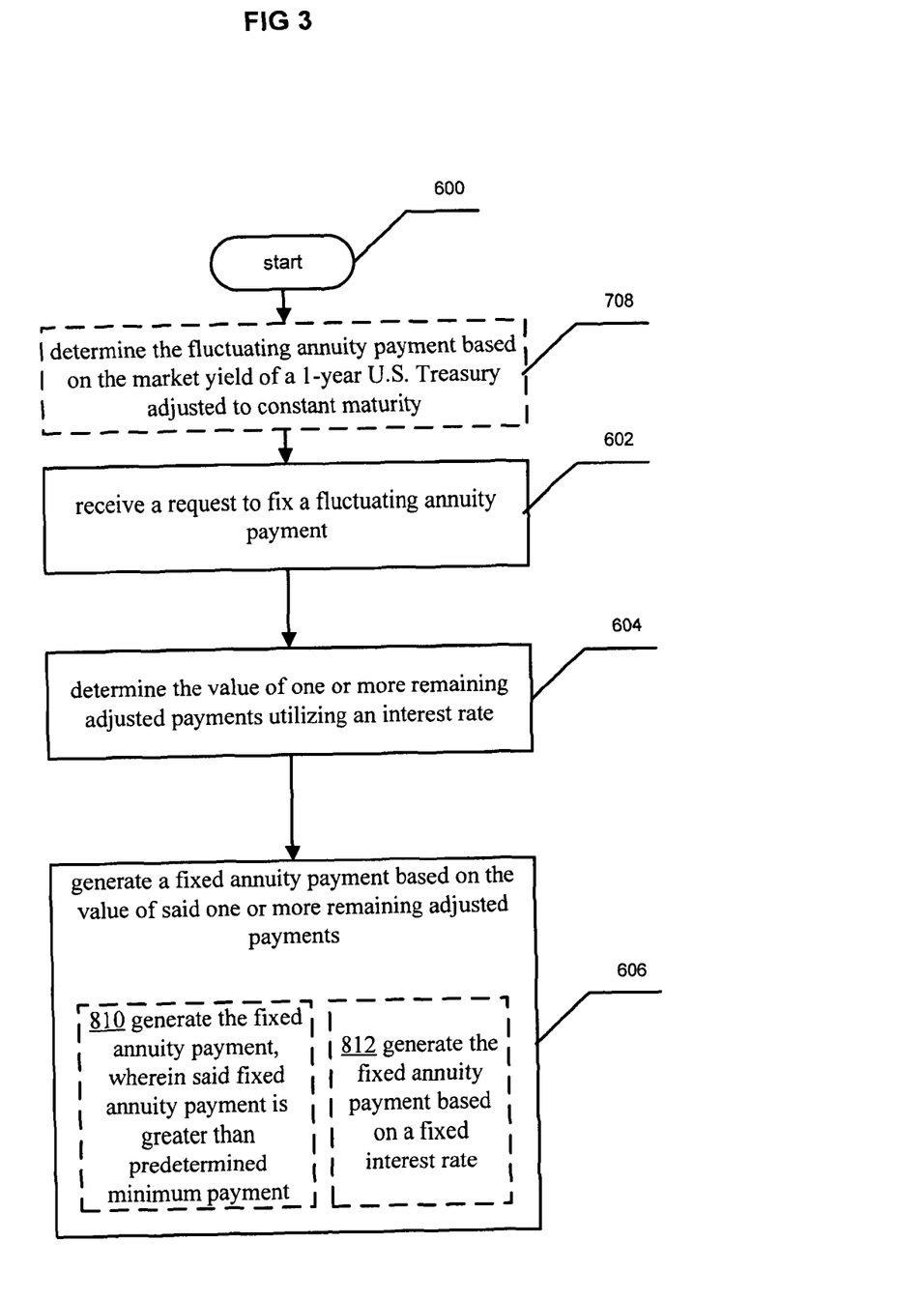
FIG. 3 illustrates an operational flow representing example operations related to fixing a fluctuating annuity payment including additional optional operations.

FIG. 3 illustrates example operations related to fixing a fluctuating annuity payment including operations 600-606. Operation 600 begins an example operational process to fix a previously established fluctuating annuity payment. A request to fix the fluctuating annuity payment is received at, for example, a database management module 102. The database management software 102 may have received the request from, for example, a user 101, an agent 101-A or any other user that has the ability to fix a periodic fluctuating annuity payment. The database may include a relational database, an object oriented database, or any electronic collection of records. For example, a database management system, e.g., computer software designed for the purpose of managing a database, receives a request to fix a fluctuating annuity payment from an insurance agent's terminal.

As depicted by operation 604 of FIG. 3, the value of one or more remaining adjusted payments is determined using an interest rate. In embodiments that include operation 604, the interest rate may be equal to the rate utilized to calculate the most recent fluctuating payment. This rate may be retrieved and used, along with discounting the sum of the remaining payments utilizing the retrieved interest rate in order to determine the value of the remaining payments.

As depicted by FIG. 3, the operational procedure 600 may additionally include operation 606. In embodiments that include operation 606 the fixed annuity payment amount is then generated from value determined at by operation 604. For example, database management module 102 of annuity database 104 may create a fixed annuity payment from the sum of the remaining adjusted payments discounted to present value and the current interest rate appropriate for a fixed annuity.

FIG. 3 additionally depicts the example operational flow 600 including additional optional operations 708, 810, and 812. In example embodiments that include operation 708 the fluctuating annuity payment may be based on the market yield of a 1-year U.S. Treasury adjusted to constant maturity. In such a case, the payment fluctuates due to changes in the market yield of a 1-year U.S. Treasury adjusted to constant maturity.

As depicted by operations 810 and 812 of FIG. 3, the fixed annuity payment may be at least a predetermined minimum payment amount or based on a fixed interest rate 812. If the fixed annuity payment is determined to be less than a predetermined minimum amount, then the fixed annuity payment is set equal to the predetermined minimum amount, and the payment amount that had been calculated based on the factors used (e.g., interest rates) is not used. The predetermined minimum amount may be have been determined when the annuity was first issued or may have been determined subsequent to the issuance of the annuity.

Figure 4:
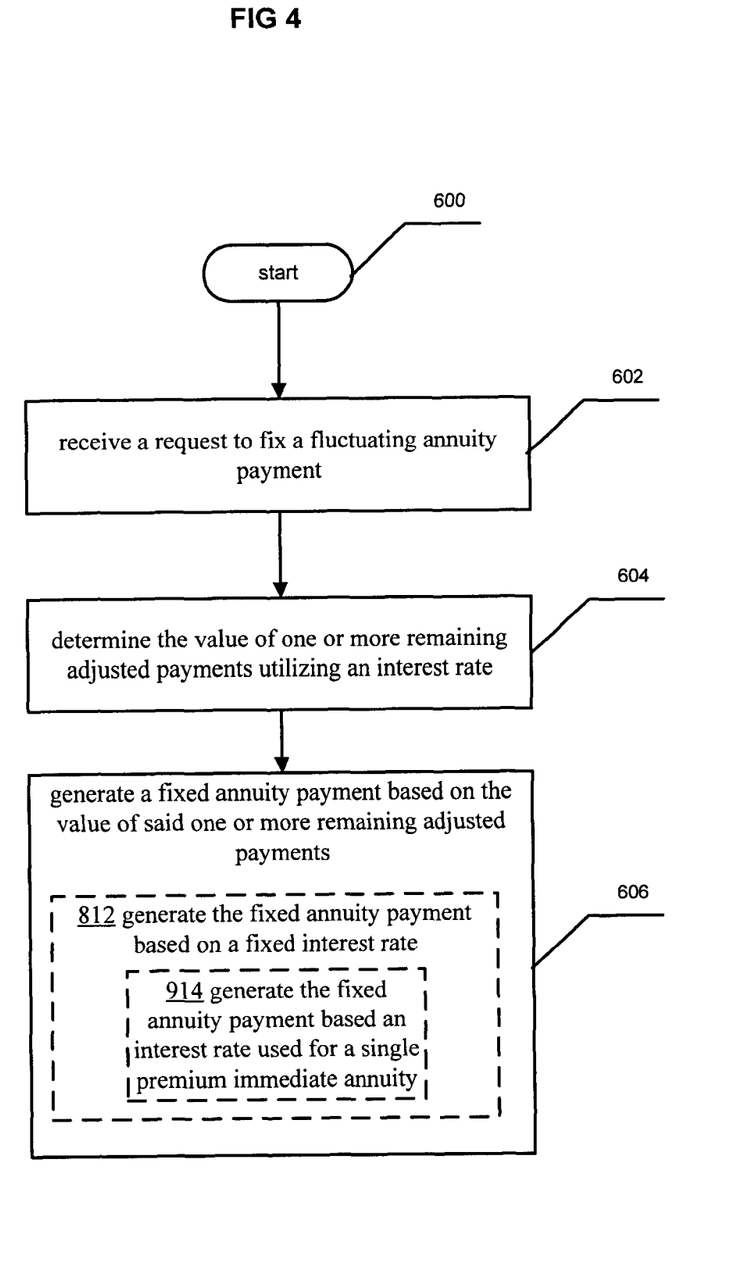
FIG. 4 illustrates additional alternative embodiments of the example operational flow of FIG. 3.

If the fixed annuity payment is to be based on a fixed interest rate, then for example, the interest rate used may be that used for a single premium annuity, at 914 of FIG. 4. For example, database management module 102 of annuity database 104 may create a fixed annuity payment from the sum of the remaining adjusted payments and an interest rate used for a single premium immediate annuity.

Figure 5:
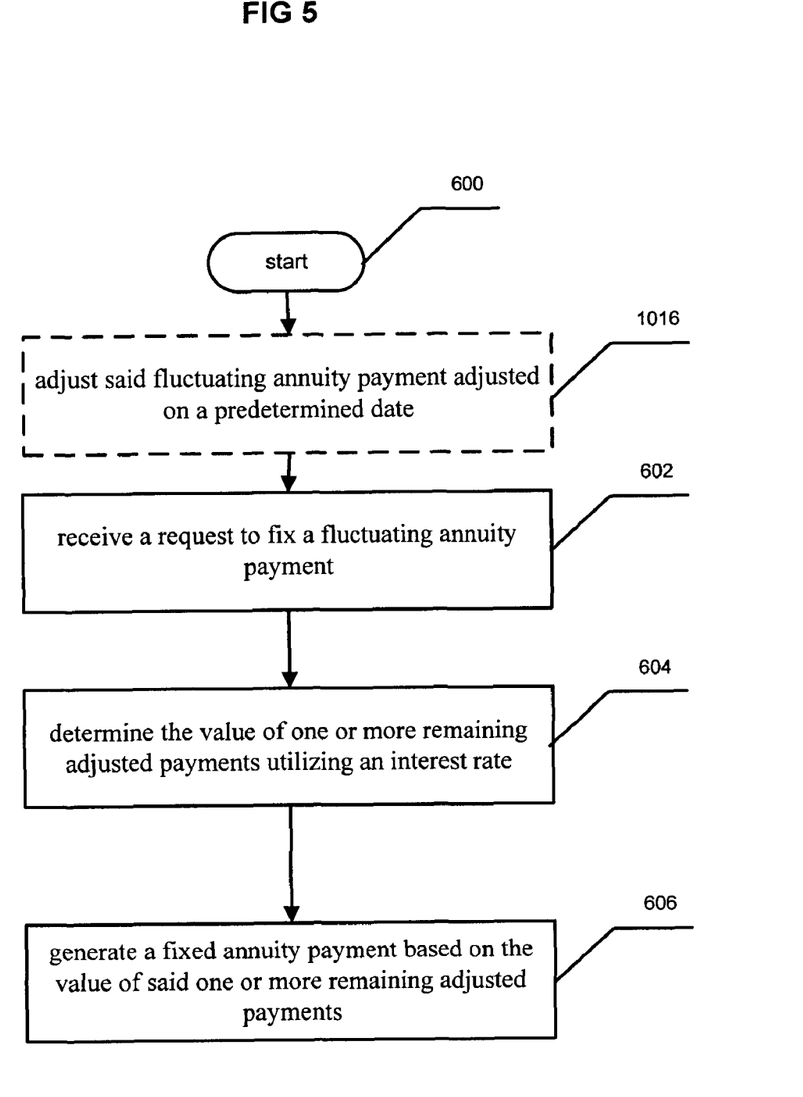
FIG. 5 illustrates additional alternative embodiments of the example operational flow of FIG. 3.

In some example embodiments of the operational procedure 600 the procedure may include operation 1016 as depicted by the operational procedure 600 of FIG. 5. In embodiments that include operation 1016, the fluctuating annuity payment amount may be adjusted on a predetermined date, e.g., a certain date of each month or each year similar to operation 212 described above.

Figure 6:
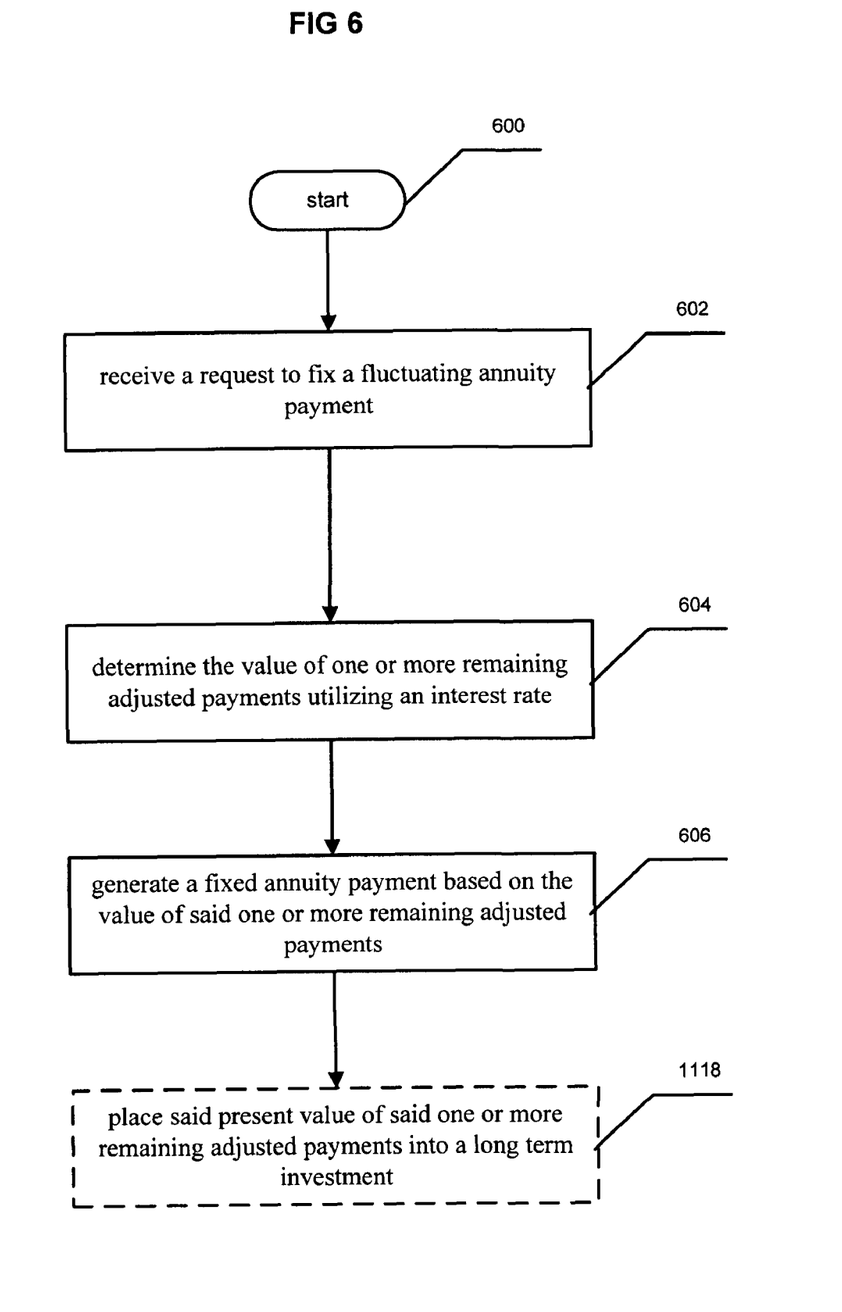
FIG. 6 illustrates additional alternative embodiments of the example operational flow of FIG. 3.

According to another embodiment, the operational procedure 600 may include operation 1118 as depicted by FIG. 6.

In embodiments that include operation 1118, the present value of the remaining adjusted payments may be placed into a long term investment. For example, database management module 102 may retrieve an amount of money equal to the present value of the sum of the remaining adjusted payments discounted to present value from a bank account controlled by the annuity provider 150. This amount may be taken by the provider 150 and invested in a long term investment such as one or more fixed income securities. In this manner, the annuity provider 150 can strategically invest in long term investments knowing that the annuitant will receive a fixed income as opposed to a fluctuating payment for the rest of the contract.

Figure 7:
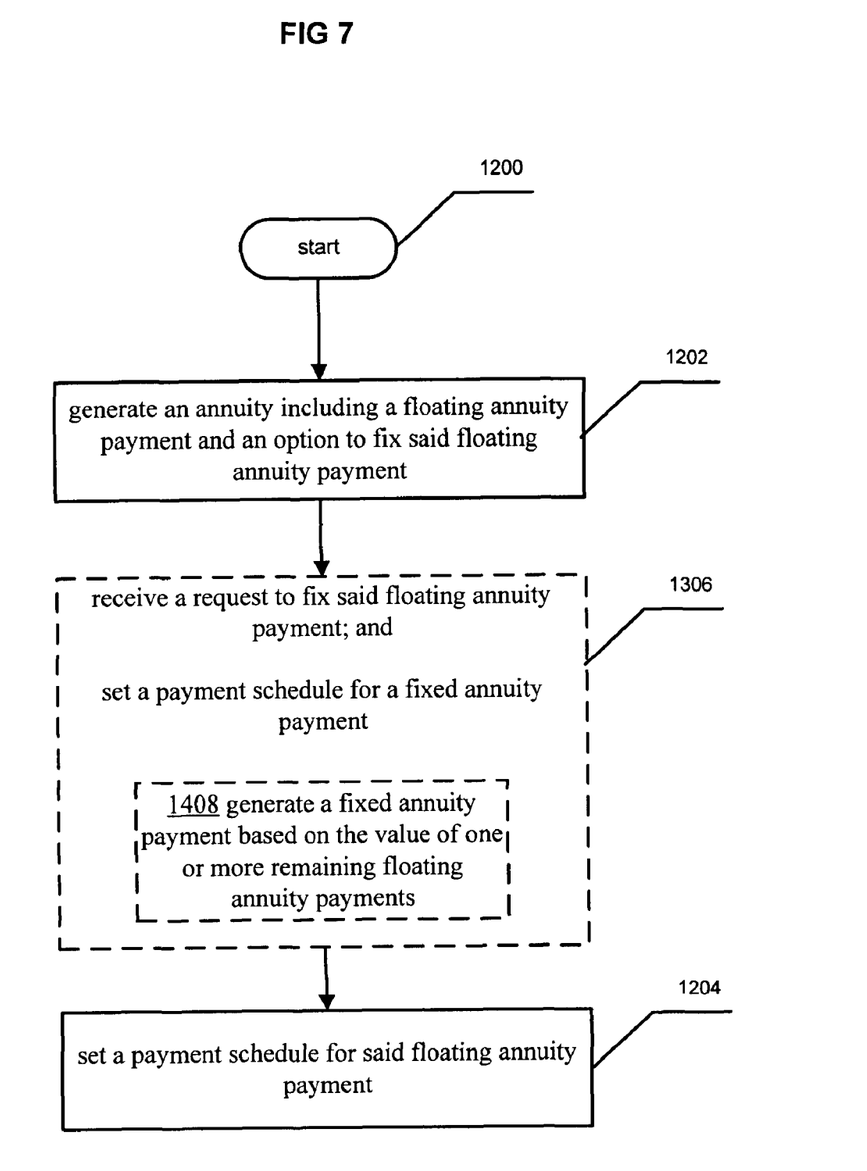
FIG. 7 illustrates an operational flow representing example operations related to fixing a fluctuating annuity payment including an additional optional operation.

FIG. 7 illustrates example operations related to fixing a fluctuating annuity payment including operations 1200-1204. FIG. 7 additionally depicts the example operational flow 7 including additional operations 1306 and 1408.

Operation 1200 begins the operational process, e.g., pursuant to a request to create an annuity. In embodiments that include example operation 1202, an annuity is created that includes a fluctuating annuity payment and an option to fix the fluctuating annuity payment in the future. Thus, the user 101 or beneficiary is able to convert the fluctuating annuity payment to a fixed payment in the future.

For example, an annuity provider 150 creates an annuity for a specific user 101, the annuity including a provision for a fluctuating annuity payment and a provision that allows the user to fix the fluctuating annuity payment. The annuity provider 150 may include a database management module 102 of an annuity database 104 including data entries representing annuities 106 issued to users 101 in generating such an annuity. The database management module 102 may generate such an annuity after it receives a request for an annuity from, for example, an application program 108 residing on an annuity provider agent 101-A terminal including a user's 101 or from an application server 140 that maintains a website 115 configured to receive requests for annuities from computer systems associated with users 101 through 101-N. The application server 140 may transmit such requests to the database management module 102 for processing and in response the website 115 may transmit code operable to display the annuity on a user's computer system. The request may include information such as age, health, the premium paid, or any type of information an annuity provider would utilize in generating an annuity.

Operation 1204 illustrates setting a payment schedule for said fluctuating annuity payment. For example, an annuity provider 150 creates a payment schedule for the generated fluctuating annuity payment, e.g., setting whether the annuity payment will be monthly, quarterly, or semi-annually. The database management module 102 may optionally receive requests from an application program 108 residing on an annuity provider agent's terminal 110 to set a payment schedule for the fluctuating annuity payment. The database management module 102 may optionally receive requests from an application server 140 that maintains a website 115 configured to receive requests to set a payment schedule for a fluctuating annuity payment.

An additional operation 1306 illustrates receiving a request to fix said fluctuating annuity payment, and setting a payment schedule for a fixed annuity payment. For example, an annuity provider 150 including a database management module 102 receives a request indicating that a specific user 101 has exercised the option to fix the fluctuating annuity payment and in response to the request the annuity provider 150 sets a payment schedule for a fixed annuity payment. Database management module 102 may have received the request to fix the payment from, for example an application program 108 residing on an annuity provider agent's terminal 110 or an application server 140 that maintains a website 115 configured to receive requests to fix the fluctuating annuity payments from users 101 through 101-N. In response to such a request, the database management module 102 may create a payment schedule for the fixed annuity payment, e.g., setting whether the annuity payment will be monthly, quarterly, or semi-annually.

An additional optional operation 1408 illustrates generating a fixed annuity payment based on the value of one or more remaining fluctuating annuity payments. For example, an annuity provider 150 including a database management module 102 generates a fixed annuity payment based on the value of sum of the remaining fluctuating annuity payments discounted to present value of the fluctuating annuity payments using, for example, an interest rate, and a long term interest rate.

Figure 8:
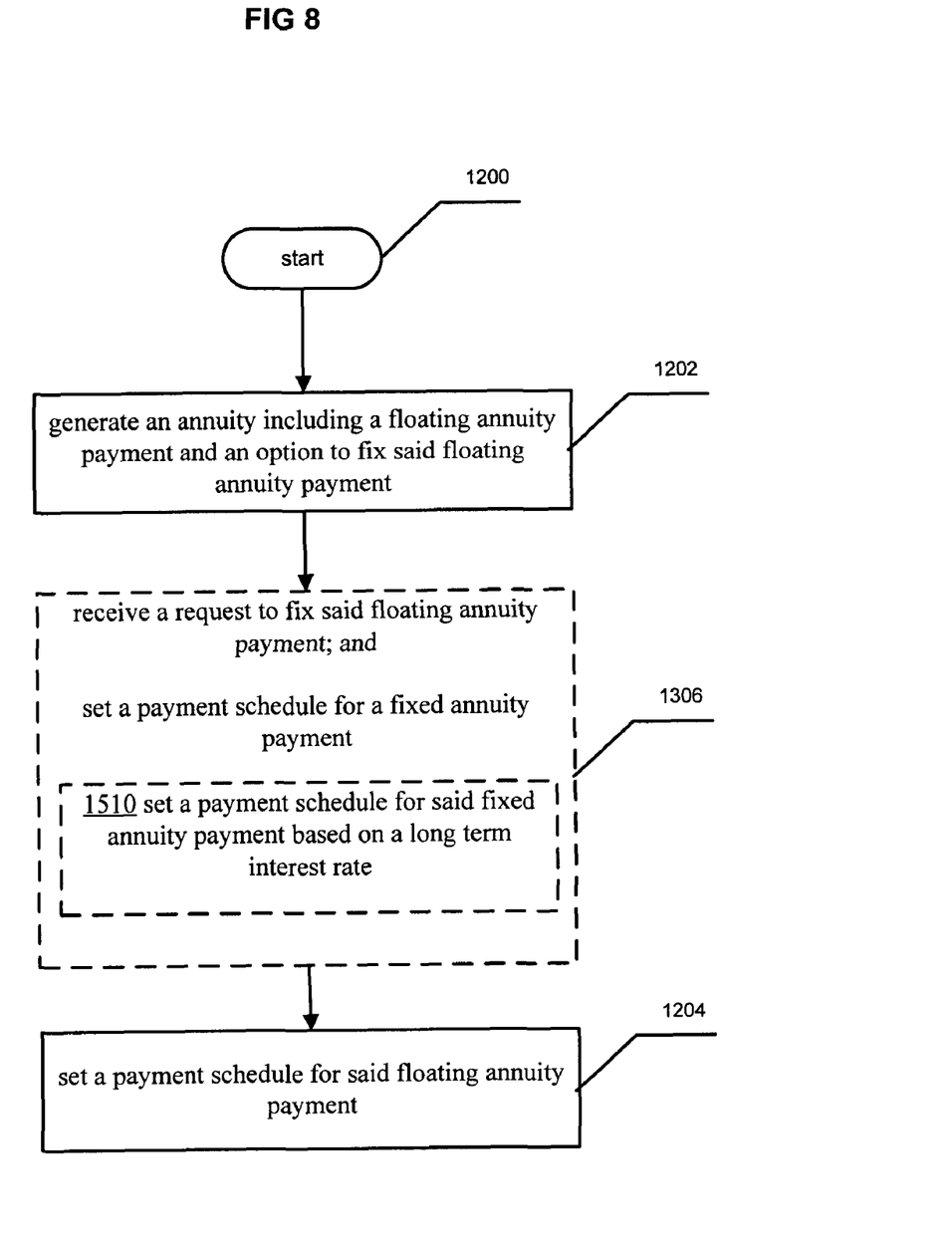
FIG. 8 illustrates additional alternative embodiments of the example operational flow of FIG. 7.

An additional operation 1510 of FIG. 8 illustrates setting a payment schedule for said fixed annuity payment based on a long term interest rate. For example, the annuity provider 150 creates a payment schedule for the fixed annuity payment, e.g., setting whether the annuity payment will be monthly, quarterly, or semi-annually wherein the fixed annuity payment is based on a long term interest rate.

Figure 9:
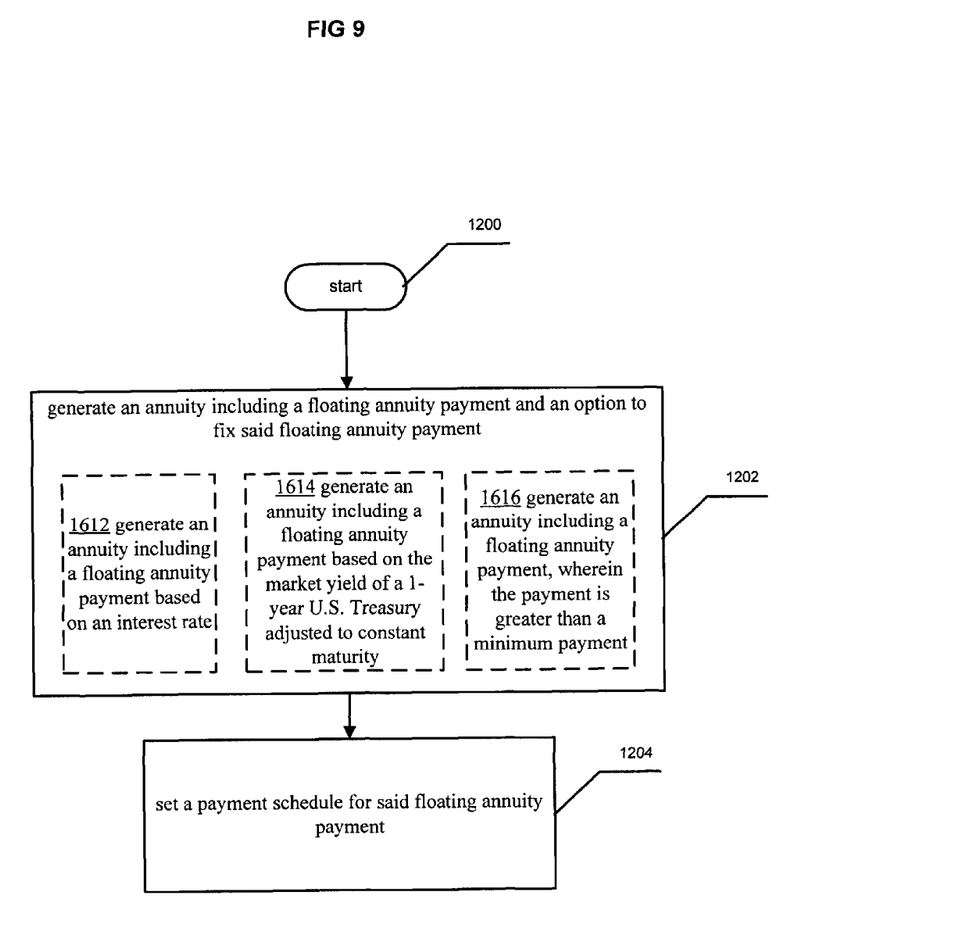
FIG. 9 illustrates additional alternative embodiments of the example operational flow of FIG. 7.

In some example embodiments the operational procedure 1200 may include one or more of the additional operation 1612, 1614, and/or 1616 as depicted by the operational flow in FIG. 9. In example embodiments that include operation 1612, the annuity includes a provision providing for a fluctuating annuity payment where the payment based on a changing interest rate. Alternately or additionally, as depicted by operation 1614, the payment may be based on the market yield of a 1-year U.S. Treasury adjusted to constant maturity.

Similar to that described above, operation 1616 illustrates that the fluctuating annuity payment may be at least a predetermined minimum payment amount. If the fluctuating annuity payment is determined to be less than a predetermined minimum amount, then the fluctuating annuity payment is set equal to the predetermined minimum amount, and the payment amount that had been calculated based on the factors used (e.g., interest rates) is not used. The predetermined minimum amount may be have been determined when the annuity was first issued or may have been determined subsequent to the issuance of the annuity.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. An annuity option processor-implemented method comprises:
generating an annuity product having a payment schedule and including a fluctuating annuity interest rate;
generating a plurality of fluctuating annuity payments based on the fluctuating annuity interest rate;
obtaining an indication to fix the fluctuating annuity interest rate;
determining, via a processor, a fixed annuity interest rate upon obtaining the indication to fix the fluctuating annuity interest rate; and
generating a fixed annuity payment based on the determined fixed annuity interest rate.

2. The method of claim 1, wherein the fluctuating annuity interest rate is determined based on data from a market data source.

3. The method of claim 1, wherein the indication is obtained from a beneficiary of the annuity.

4. The method of claim 1, wherein the fixed annuity interest rate is determined based on a last determined value of the fluctuating annuity interest rate prior to obtaining the indication to fix the fluctuating annuity interest rate.

5. The method of claim 1, wherein generating the fixed annuity payment is further based on a sum of remaining fluctuating annuity payments to be made in said payment schedule when the indication to fix the fluctuating annuity interest rate is obtained.

6. The method of claim 1, further comprising:
determining a minimum amount of the fluctuating annuity payments after generating the annuity.

7. The method of claim 1, further comprising:
upon obtaining the indication to fix the fluctuating annuity interest rate,
determining a net present value of remaining adjusted payments to be made; and
investing the determined net present value in long-term investments.

8. A processor-readable medium storing processor-executable annuity option instructions, the instructions comprising instructions to:
generate an annuity including a payment schedule and a fluctuating annuity interest rate;
generate a plurality of fluctuating annuity payments based on the fluctuating annuity interest rate;
obtain an indication to fix the fluctuating annuity interest rate;
determine a fixed annuity interest rate upon obtaining the indication to fix the fluctuating annuity interest rate; and
generate a fixed annuity payment based on the determined fixed annuity interest rate.

9. The medium of claim 8, wherein the fluctuating annuity interest rate is determined based on data from a market data source.

10. The medium of claim 8, wherein the indication is obtained from a beneficiary of the annuity.

11. The medium of claim 8, wherein the fixed annuity interest rate is determined based on a last determined value of the fluctuating annuity interest rate prior to obtaining the indication to fix the fluctuating annuity interest rate.

12. The medium of claim 8, wherein generating the fixed annuity payment is further based on a sum of remaining fluctuating annuity payments to be made when the indication to fix the fluctuating annuity interest rate is obtained.

13. The medium of claim 8, the instructions further comprising instructions to:
determine a minimum amount of the fluctuating annuity payments after generating the annuity.

14. The medium of claim 8, the instructions further comprising instructions to:

upon obtaining the indication to fix the fluctuating annuity interest rate,
  determine a net present value of remaining adjusted payments to be made; and
  invest the determined net present value in long-term investments.

15. An annuity option exercising processor-implemented method, comprises:
  providing a request to generate an annuity including a fluctuating annuity interest rate;
  obtaining an indication of a plurality of fluctuating annuity payments based on the fluctuating annuity interest rate;
  generating via a processor an indication to fix the fluctuating annuity interest rate;
  providing the indication to fix the fluctuating annuity interest rate;
  obtaining a notification of a fixed annuity interest rate upon providing the indication to fix the fluctuating annuity interest rate; and
  obtaining an indication of a fixed annuity payment based on the fixed annuity interest rate.

16. The method of claim 15, wherein the fluctuating annuity interest rate is determined based on data from a market data source.

17. The method of claim 15, wherein the indication is providing by a beneficiary of the annuity.

18. The method of claim 15, wherein the fixed annuity interest rate is determined based on a last determined value of the fluctuating annuity interest rate prior to providing the indication to fix the fluctuating annuity interest rate.

19. The method of claim 15, wherein the fixed annuity payment is generated based on a sum of remaining fluctuating annuity payments to be made when the indication to fix the fluctuating annuity interest rate is provided.

20. The method of claim 15, further comprising:
  providing a request to determine a minimum amount of the fluctuating annuity payments after generating the annuity.

21. The method of claim 15, further comprising:
  upon providing the indication to fix the fluctuating annuity interest rate,
    providing a request to determine a net present value of remaining adjusted payments to be made; and
    providing a request to invest the determined net present value in long-term investments.

* * * * *